(12) United States Patent
Barthel et al.

(10) Patent No.: US 10,029,691 B2
(45) Date of Patent: Jul. 24, 2018

(54) OPERATING STRATEGY FOR HYBRID VEHICLES FOR THE IMPLEMENTATION OF A LOAD POINT SHIFT, A RECUPERATION AND A BOOST

(71) Applicant: Deere & Company, Moline, IL (US)

(72) Inventors: Jochen Barthel, Kaiserslautern (DE); Philipp Muench, Kaiserslautern (DE); Markus Bell, Mannheim (DE); Daniel Goerges, Birkheim (DE)

(73) Assignee: Deere & Company, Moline, IL (US)

( * ) Notice: Subject to any disclaimer, the term of this patent is extended or adjusted under 35 U.S.C. 154(b) by 309 days.

(21) Appl. No.: 14/922,233

(22) Filed: Oct. 26, 2015

(65) Prior Publication Data

US 2016/0039417 A1    Feb. 11, 2016

Related U.S. Application Data

(63) Continuation of application No. PCT/EP2014/056172, filed on Mar. 27, 2014.

(30) Foreign Application Priority Data

Apr. 26, 2013    (DE) .......................... 10 2013 207 680

(51) Int. Cl.
*B60W 30/00*    (2006.01)
*B60W 30/182*    (2012.01)
(Continued)

(52) U.S. Cl.
CPC .......... *B60W 30/182* (2013.01); *B60W 10/06* (2013.01); *B60W 10/08* (2013.01);
(Continued)

(58) Field of Classification Search
None
See application file for complete search history.

(56) References Cited

U.S. PATENT DOCUMENTS 9,266,529 B2 *  2/2016  Dufford .............. B60W 20/40
9,340,198 B2 *  5/2016  Ito ....................... B60K 6/445
(Continued)

FOREIGN PATENT DOCUMENTS

DE    102004023512    12/2005
DE    102008008238    8/2008
(Continued)

OTHER PUBLICATIONS

International Search Report dated May 12, 2014 (3 pages).

*Primary Examiner* — Jonathan M Dager

(57) ABSTRACT

A hybrid drive includes a combustion engine, a generator driven by the combustion engine, a charge storage unit, and an electric engine. The hybrid drive can be driven in a load point shifting mode, a recuperation mode, and a boost mode. In the load point shifting mode, a power or torque distribution regulator specifies the torques supplied by the combustion engine and the electric engine in the sense of a maintenance of a predetermined theoretical value of the charging state of the charge storage unit. The theoretical value of the charging state of the charge storage unit is shifted in the load point shifting mode, as a function of the charging state changes of the charge storage unit in a previously carried out recuperation or boost mode.

11 Claims, 3 Drawing Sheets

(51) Int. Cl.

| | | |
|---|---|---|
| *B60W 10/06* | (2006.01) | |
| *B60W 10/08* | (2006.01) | |
| *B60W 10/26* | (2006.01) | |
| *B60W 20/10* | (2016.01) | |
| *B60W 20/13* | (2016.01) | |
| *B60W 20/14* | (2016.01) | |
| *B60W 20/19* | (2016.01) | |
| *B60W 20/00* | (2016.01) | |
| *B60W 50/00* | (2006.01) | |

(52) U.S. Cl.
CPC ............ *B60W 10/26* (2013.01); *B60W 20/10* (2013.01); *B60W 20/106* (2013.01); *B60W 20/1088* (2013.01); *B60W 20/13* (2016.01); *B60W 20/14* (2016.01); *B60W 20/19* (2016.01); *B60W 2050/001* (2013.01); *B60W 2050/0089* (2013.01); *B60W 2300/152* (2013.01); *B60W 2510/244* (2013.01); *B60W 2530/14* (2013.01); *B60W 2710/0666* (2013.01); *B60W 2710/0677* (2013.01); *B60W 2710/083* (2013.01); *B60W 2710/086* (2013.01); *B60W 2710/244* (2013.01); *B60Y 2200/221* (2013.01); *Y02T 10/6286* (2013.01); *Y10S 903/93* (2013.01)

(56) References Cited

U.S. PATENT DOCUMENTS

| | | | | |
|---|---|---|---|---|
| 2009/0118081 A1* | 5/2009 | Heap | ........................ | B60K 6/26 477/3 |
| 2009/0236160 A1* | 9/2009 | Tanaka | ..................... | B60K 6/365 180/65.265 |
| 2009/0266631 A1* | 10/2009 | Kikuchi | ................. | B60L 11/123 180/65.265 |
| 2010/0070122 A1* | 3/2010 | Niimi | ........................ | B60K 6/445 701/22 |
| 2010/0087978 A1* | 4/2010 | Fleckner | .................. | B60L 11/12 701/22 |
| 2010/0125019 A1* | 5/2010 | Tabata | ...................... | B60K 6/26 477/3 |
| 2011/0231043 A1* | 9/2011 | Ebuchi | ..................... | B60K 6/365 701/22 |
| 2012/0130577 A1* | 5/2012 | Ichimoto | ................ | B60W 20/00 701/22 |
| 2013/0017926 A1* | 1/2013 | Miwa | ....................... | B60K 6/445 477/3 |
| 2013/0096764 A1* | 4/2013 | Yamamoto | .............. | B60K 6/445 701/22 |
| 2013/0190958 A1* | 7/2013 | Izumi | ..................... | B60W 20/20 701/22 |
| 2013/0253749 A1* | 9/2013 | Hayashi | ................. | B60K 6/445 701/22 |
| 2013/0304291 A1* | 11/2013 | Nawata | .................. | B60K 6/445 701/22 |
| 2013/0307329 A1* | 11/2013 | Ito | .......................... | B60K 6/445 307/10.1 |
| 2014/0114514 A1* | 4/2014 | Crombez | .............. | B60W 10/06 701/22 |
| 2014/0288743 A1* | 9/2014 | Hokoi | ................... | B60W 20/40 701/22 |
| 2014/0303820 A1* | 10/2014 | Aoki | ..................... | B60W 10/08 701/22 |
| 2014/0350764 A1* | 11/2014 | Arai | ...................... | B60W 40/10 701/22 |
| 2015/0002053 A1* | 1/2015 | Endo | ................... | B60L 11/1803 318/139 |
| 2015/0057862 A1* | 2/2015 | Sato | ........................ | B60K 6/445 701/22 |
| 2015/0298683 A1* | 10/2015 | Hisano | .................. | B60K 6/445 701/22 |
| 2015/0298686 A1* | 10/2015 | Itagaki | .................. | B60K 6/445 701/22 |
| 2016/0368483 A1* | 12/2016 | Nawata | ................. | B60W 10/06 |

FOREIGN PATENT DOCUMENTS

| | | |
|---|---|---|
| DE | 102007012129 | 9/2008 |
| DE | 102007024471 | 11/2008 |
| WO | 2012084632 | 2/2013 |

* cited by examiner

OPERATING STRATEGY FOR HYBRID VEHICLES FOR THE IMPLEMENTATION OF A LOAD POINT SHIFT, A RECUPERATION AND A BOOST

RELATED APPLICATIONS

This application is a continuation application of International Application Serial No. PCT/EP2014/056172, which has an international filing date of Mar. 27, 2014, and which claims the benefit of German Application Ser. No. 102013207680.0, filed on Apr. 26, 2013. The disclosures of these aforementioned applications are hereby expressly incorporated by reference in their entirety.

FIELD OF THE DISCLOSURE

The present disclosure relates to a method for the control of a hybrid drive, and in particular to a hybrid drive which can be operated in a load point shifting mode, a recuperation mode, and a boost mode.

BACKGROUND

Hybrid drives for work machines include a combustion engine, a generator driven by the combustion engine, a charge storage unit, and an electric engine. The propulsion of the work machine or the drive by components driven by the work machine are carried out by a drive train, in which the drive torque of the combustion engine and the electric engine are superimposed by a summation gear, e.g., a planetary gear, or act jointly on a shaft. Such hybrid drives can be operated in different operating modes, such as (a) a load point shifting mode, in which the generator charges the charge storage unit or the electric engine supplied by the charge storage unit makes available an additional drive torque for the drive train and improves the efficiency of the combustion engine; (b) a recuperation mode, in which the electric engine is used as a generator and converts the kinetic energy of the work machine into electric energy for the charging of the charge storage unit; and (c) a boost mode, in which the combustion engine and the electric engine supplied by the charge storage unit are operated with maximum power, so as to overcome short-term load peaks. The switch between the operating modes takes place as a function of the momentary speed of the combustion engine and the momentary load torque.

In the load point shifting mode, there is a division of the drive power into the power made available by the combustion engine and the power made available by the charge storage unit. Therefore, such hybrid drives make available another level of freedom in comparison to conventional drives, in which only the power of the combustion engine can be changed. For the specification of the torque of the combustion engine and the torque of the electric engine or for the division of a power being made available between the combustion engine and the electric engine, different types of regulators are used in the state of the art, in particular proportional-integral regulators or heuristic regulators. Such so-called power or torque distribution regulators must observe additional boundary conditions, such as an effort to maintain the theoretical value of a specific charge in the charge storage unit, and to optimize, in the sense of an optimizing of the total effectiveness.

The transition behavior between the operating modes can prove to be problematic with the power or torque distribution regulators used in the state of the art. If, for example, the recuperation mode is active, the charging state of the charge storage unit is increased by the recuperated kinetic energy. If, subsequently, the load point shifting mode is active, the regulator attempts to, once again, compensate for the charging increase. In this way, the charge in the charge storage unit is again reduced, but at the expense of a more unfavorable efficiency of the combustion engine. However, with a subsequent boost, then, the recuperated charge in the charge storage unit is missing.

In the state of the art, operating strategies have been described which deal with a load point shift, a recuperation, and a boost, and are based on heuristics or optimizing methods. With heuristics, low hardware demands are advantageous, but at the expense of an often low consumption reduction and a high parameterization expense. With optimizing methods, a higher reduction in consumption can be attained, but with complex hardware demands.

SUMMARY

In one embodiment, a hybrid drive includes a combustion engine, a generator which can be driven by the combustion engine, a charge storage unit, and an electric engine. By a control device, it is possible to optionally operate in a load point shifting mode, a recuperation mode, and a boost mode. In the load point shifting mode, a power or torque distribution regulator specifies the power or torque supplied by the combustion engine and the electric engine, in the sense of a maintenance of a predetermined theoretical value of the charging state of the charge storage unit, wherein there is the additional effort to attain an improvement of the efficiency of the combustion engine. The theoretical value of the charging state of the charge storage unit considered by the power or torque distribution regulator is shifted in the load point shifting mode as a function of the charging state changes of the charge storage unit, which occurred in a previously carried out recuperation mode or boost mode.

In one example, the theoretical value of the charging state of the charge storage unit is automatically shifted upward to a recuperation operation or downward to a boost operation. As such, the power or torque distribution regulator no longer attempts to attain a middle charging state, but rather adapts the theoretical value of the charging state to the actual operation of the hybrid drive. In this way, the hybrid drive can have recourse to the charge quantities in the subsequent recuperation or boost processes or again fill the charge storage unit, without leaving the permissible charge limits of the charge storage unit. These charge limits are set at values that guarantee a sufficient service life of the charge storage unit and are, for example, 20% of the maximum charge as a lower limit and 80% of the maximum charge as an upper limit.

If a recuperation or a boost appears several times one after the other, the permissible charge limits of the charge storage unit may be harmed. In order to avoid exceeding the charge limits, the shifted theoretical value of the charging state in such cases can gradually (for example, in ramped fashion) be restored to the nominal theoretical value of the charging state (for example, 50% of the maximum charge).

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
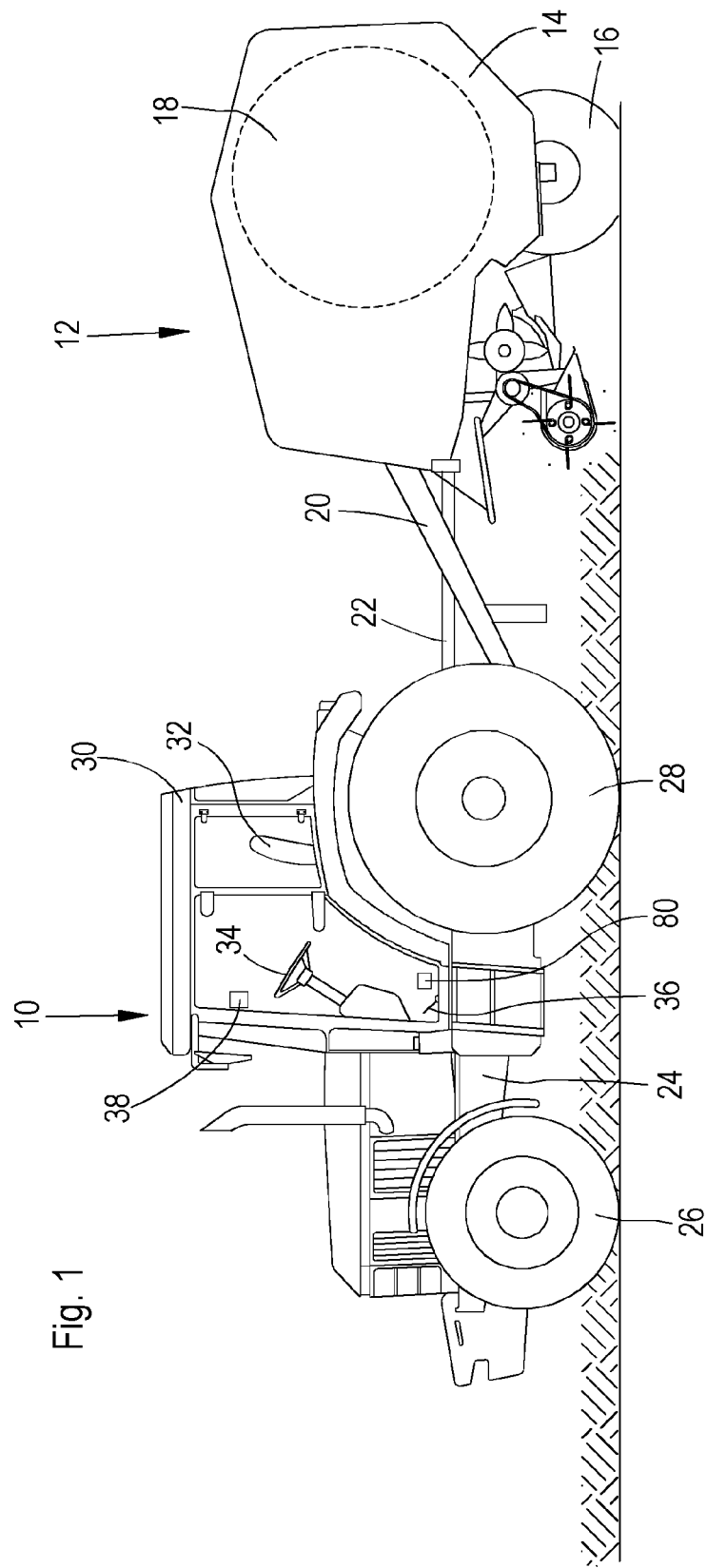
FIG. 1 is a side view of an agricultural work machine in the form of a tractor with a pulled baler.

In FIG. 1, an embodiment of an agricultural work machine is shown in the form of a tractor 10 and a round baler 12, pulled by the tractor 10. The round baler 12 is, in fact, conventional and includes a chassis 14 supported on wheels 16, with a bale-forming chamber 18. The round baler 12 is pulled by a tow bar 20 from the tractor 10 and its drivable elements are driven by means of a PTO shaft 22 from the tractor 10. The tractor 10 includes a chassis 24, which is supported on front, steerable wheels 26 and rear, driven wheels 28. An operator workstation with a seat 32 is located in a cabin 30. From the seat, a steering wheel 34, a gas pedal 36, and an operator interface 38 with a display device and a keyboard or a contact-sensitive display device can be operated.

Figure 2:
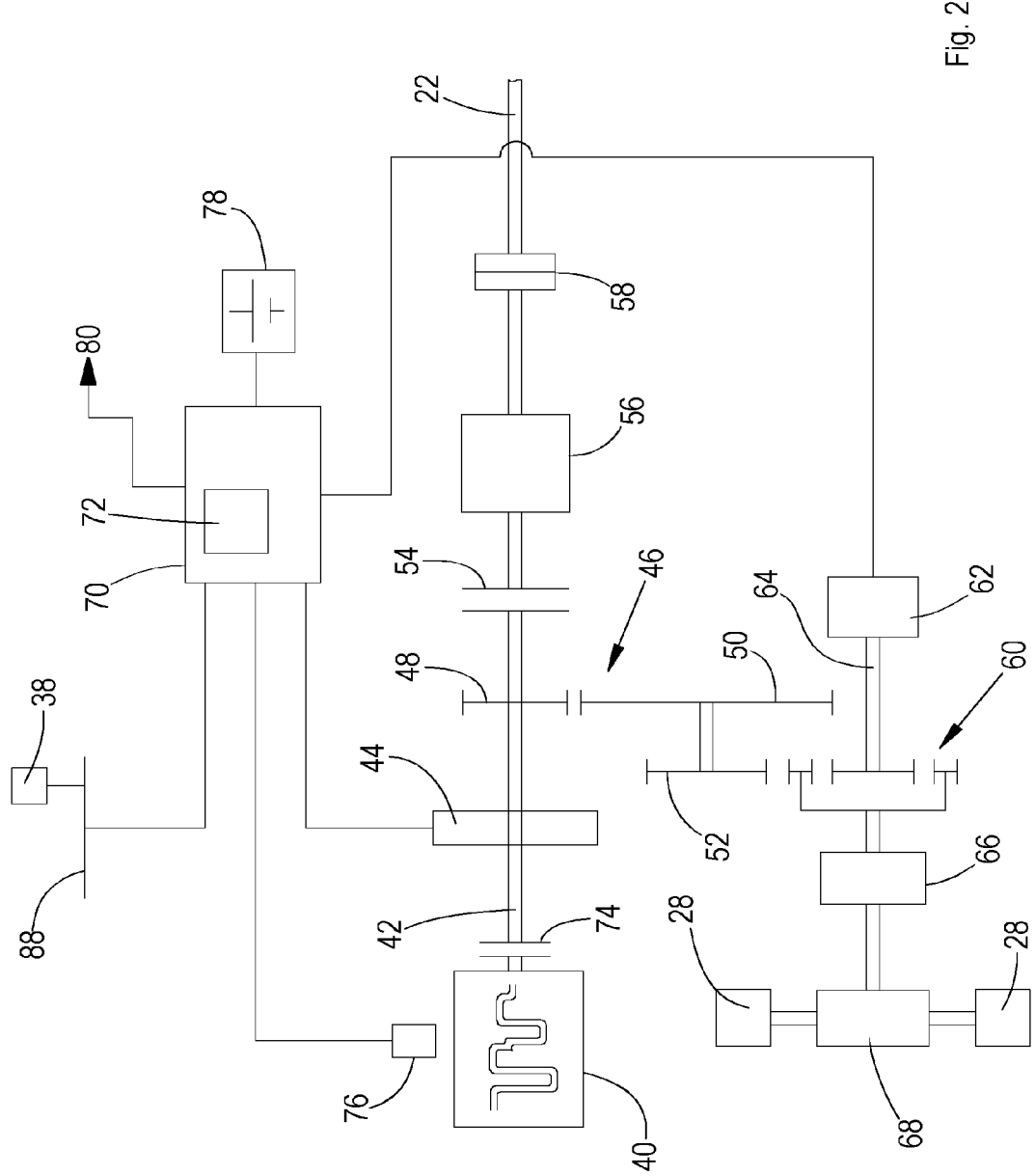
FIG. 2 is a schematical view of a drive train of the work machine and the corresponding control device.

FIG. 2 shows one embodiment of a drive train of the work machine. The crankshaft of a combustion engine 40, e.g., a diesel engine, drives a shaft 42 via a separable clutch 74. The shaft 42 drives an electric generator 44, an intermediate gear 46 with gear wheels 48, 50 and 52, and the entry side of the separating clutch of the PTO shaft 54. The separating clutch of the PTO shaft 54 is connected, on the exit side, with the entry of a power shaft PTO transmission 56, which, on the exit side, drives a separable clutch of the PTO shaft 58 on which the PTO shaft 22 of the round baler 12 is coupled in a detachable manner. The intermediate gear 46 is connected, on the exit side, with a summation gear 60. The summation gear 60 is implemented in the form of a planetary gear, whose annular wheel meshes with the exit gear wheel 52 of the intermediate gear 46 and whose sun gear is connected with the exit shaft 64 of an electric engine 62. The planetary wheel support is coupled with the entry side of a gear box 66, which, on the exit, drives the rear wheels 28 via a differential gear 68.

In another embodiment, the power shift PTO transmission 56 can also be driven downstream from the summation gear 60. Furthermore, the gear box 66 can be designed as a power shift transmission. In yet another embodiment, summation gears 60 can be assigned to the individual wheels 28 and perhaps also to the front wheels 26. In another embodiment, the electric engine 62 can transfer its torque directly or via a gear on the shaft 42 or at another location on the drive train. In other words, the summation gear 60 may be omitted and the electric engine 62 can take over the tasks of the generator 44. In yet another embodiment, the mechanical power can be produced entirely by the electric engine 62, wherein then, the maximum power of the generator 44 and the electric engine 62 may be increased since the mechanical drive branch is omitted.

A control device 70 is electrically connected with the generator 44, a combustion engine control 76, a charge storage unit 78 in the form a battery (or high-capacity capacitor, or the like), and the electric engine 62. Furthermore, the control device 70 is coupled with a sensor 80 for the detection of the position of the gas pedal 36. Another sensor (not shown) can detect the position of a brake pedal (not shown) or the pressure in the brake system.

The gear box 66 can be switched manually by the operator via a lever mechanism, automatically by the control device 70, or via the operator interface 38 and an actuator (not shown) controlled by the control device 70. The separating clutch of the PTO shaft 54 can be switched via a mechanism by the operator or the operator interface 38, or a separate switch and an actuator (not shown) controlled by the control device 70. Analogously, the clutch 74 can also be switched by the operator mechanically via a pedal (not shown), or via the operator interface 38 and an actuator (not shown) controlled by the control device 70.

During operation, the operator specifies, via the gas pedal 36, a desired speed of the tractor 12. This desired speed is transmitted via the sensor 80 to the control device 70, which, in a load point shifting mode, regulates the combustion engine control 76 and the electric engine 62 as a function of the signals of the power or torque distribution regulator 72. The control device 70 in the load point shifting mode removes, as a function of the specifications of the power or torque distribution regulator 72, electrical power from the charge storage unit 78 in order to drive the electric engine 62 or charges the charge storage unit 78 with electric power from the generator 44. In addition, a recuperation mode is provided, in which the generator 44, in the deceleration mode, is used as a brake and gains the kinetic energy of the work machine and supplies it as electric energy to the charge storage unit 78. Finally, a boost mode is also provided, in which the electric engine 62 is acted on with maximum power from the charge storage unit 78, whereas the combustion engine 40 is also operated with maximum power.

Figure 3:
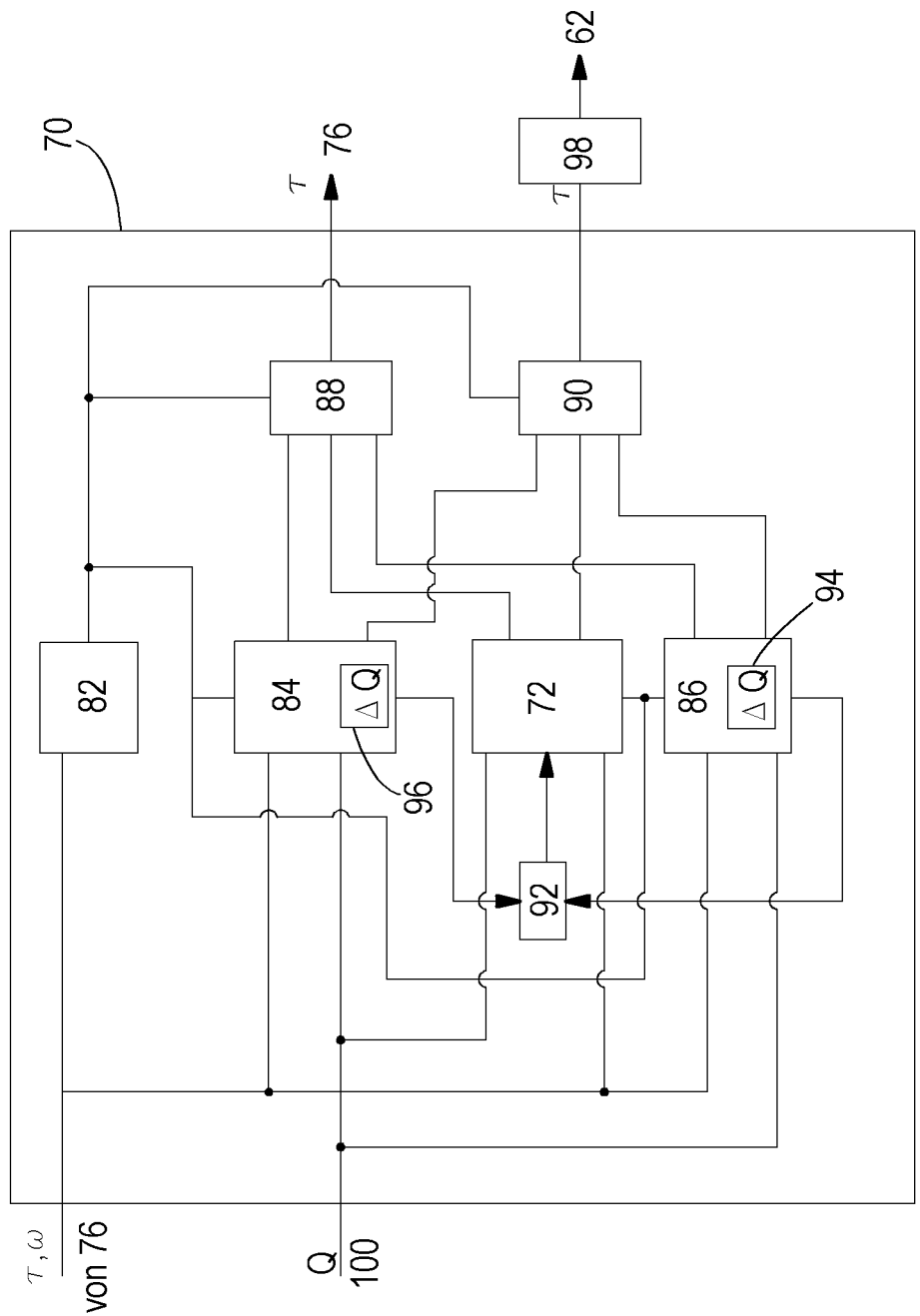
FIG. 3 is a schematical view of the control device.

In another embodiment, FIG. 3 shows a detailed scheme of the control device 70. It includes a state change-over switch 82, a recuperation control 84 with a charge gauge 96, the power or torque distribution regulator 72, a boost control 86 with a charge gauge 94, a charging state theoretical value determining unit 92, and two output change-over switches 88, 90.

During operation, the rotational speed ω and the load torque τ of the combustion engine 40 are supplied to the state change-over switch 82 by the combustion engine control 76 as input variables. The state change-over switch 82 can also be impinged on with information regarding the load torque τ of the electric engine 62, which can be estimated with the aid of its electric variables. The rotational speed ω and the load torque τ of the combustion engine 40 or of the electric engine 62 can also be detected by separate sensors. These variables are sufficient so that the state change-over switch can automatically determine when a recuperation operation is appropriate (for example, if the rotational speed of the combustion engine 40 is above a threshold value and the sum of the load torques of the combustion engine 40 and the electric engine 62 is below a first threshold value), when a boost operation is appropriate (for example, if the aforementioned sum of the load torques is above a second threshold value that is larger than the first threshold value), and when a load point shifting mode is appropriate (for example, if none of the other operating modes is appropriate).

Depending on which operating mode is recognized as appropriate and therefore is selected, the state change-over switch 82 switches to activate the outputs of the recuperation control 84 or of the power or torque distribution regulator 72 or the boost control 86, via the output switches 88, 90. In other words, an output signal of the recuperation control 84 or of the power or torque distribution regulator 76 or the boost control 86 is supplied to the combustion engine control 76, so as to specify the power or the torque of the combustion engine 40. An output signal of the recuperation control 84 or of the power or torque distribution regulator 72 or the boost control 86 is also supplied to a control switch 98 of the electric engine 62, which specifies the power of the torque of the electric engine 62. Also, the recuperation control 84, the power or torque distribution regulator 72, and the boost control 86 are impinged on with the output signal of the state change-over switch 82, so as to signal to them which of them has just been made active.

The boost control 86 is also impinged on by the combustion engine control 76 with the input variables rotational speed ω and load torque τ of the combustion engine 40 and perhaps of the electric engine 62. Furthermore, via a connection 100, it receives a charging state signal from the charge storage unit 78. In the boost mode, the boost control 86 causes the combustion engine 40 and the electric motor 62 to work with a maximum torque, so as to overcome load peaks on a short-term basis. During the boost mode, the charge gauge 96 determines the charge quantity supplied by the charge storage unit 78.

The recuperation control 84 is likewise impinged on by the combustion engine control 76 with the input variables rotational speed ω and torque τ of the combustion engine 40. Furthermore, via the connection 100, it receives a charging state signal from the charge storage unit 78. In the recuperation mode, the recuperation control 84 causes the combustion engine 40 to work with a minimum torque or at idling speed and the generator 44 or the electric engine 62 to work with a maximum, negative torque, so as to convert the kinetic energy of the work machine into electric energy, which is stored in the charge storage unit 78. This torque can also depend on the position of the brake pedal or on the brake pressure. During the recuperation mode, the charge gauge 94 determines the charge quantity taken up by the charge storage unit 78.

The power or torque distribution regulator 72 is likewise impinged on by the combustion engine control 76 with the input variables rotational speed ω and load torque τ of the combustion engine 40 and perhaps the electric engine 62. Furthermore, via the connection 100, it receives a charging state signal from the charge storage unit 78. In the load point shifting mode, the power or torque distribution regulator 72 causes the combustion engine 40 to work with a torque or power specified by it and also specifies the torque or the power of the electric engine 62 and thus also a charging or discharging current of the charge storage unit 78. The power or torque distribution regulator 72 may be a proportional-integral regulator. For details on the structure and the mode of operation of the torque distribution regulator 72, reference is made to the publications by Michiel Koot, J. T. B. A. Kessel, Bram de Jager, W. P. M. H. Heemels, P. P. J. van den Bosch, and Maarten Steinbuch: Energy management strategies for vehicular electric power systems, IEEE Transactions on Vehicular Technology, 54(3): 771-782, 2005, and John T. B. A. Kessels, Michiel W. T. Koot, Paul P. J. van den Bosch, and Daniel B. Kok: Online energy management for hybrid electric vehicles, IEEE Transactions on Vehicular Technology 57(6):3428-3400, 2008. The aforementioned publications are hereby incorporated by reference in this disclosure.

The power or torque distribution regulator 72 controls its outputs in the sense that the attempt is made to maintain a specific charging state of the charge storage unit 78, wherein, in addition, the effort is made to have an improvement of the efficiency of the combustion engine 40. This theoretical value of the charging state of the charge storage unit 78 may correspond with previous power or torque distribution regulators, to a firm value of, for example, approximately 50% of the capacity of the charge storage unit 78. In accordance with this disclosure, this theoretical value, however, is specified by the charging state theoretical value determining unit 92. This is impinged on with the signals of the charging gauges 94, 96 and transfers to the power or torque distribution regulator 72 a theoretical value which, after a boost operation, is reduced by the value of the charging gauge 96 and, after a recuperation operation, is increased by the value of the charging gauge 94. The power or torque distribution regulator 72 controls its output values in such a way that the theoretical value made available by the charging state theoretical value determining unit 92 is desired. In this way, after a recuperation operation, a larger charge is available in the charge storage unit 78, which is, in turn, available in a later boost operation, and vice versa. If a recuperation operation or a boost operation occurs several times, one after another, the shifted theoretical value of the charging state can gradually (for example, in ramped fashion) be restored to the nominal theoretical value of the charging state.

Contrary to the representation in FIG. 3, the boost control 86 and the power or torque distribution regulator 72 are impinged on with the signal of the sensor 80 of the gas pedal 36 (or an automatic control for the specification of the propulsion rate of the work machine), so as to take into consideration the theoretical speed of the work machine during the calculation of the output values.

While embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A method for controlling a hybrid drive, comprising:
   providing a combustion engine, a generator driven by the combustion engine, a charge storage unit, an electric engine, and a distribution regulator;
   providing a predetermined theoretical value of a charging state of the charge storage unit;
   operating in a recuperation mode or boost mode;
   detecting a change in charge state of the charge storage unit when operating in the recuperation mode or boost mode;
   operating in the load point shifting mode;
   while operating in the load point shifting mode, identifying a power or torque to be supplied by the combustion engine and the electric engine by the distribution regulator;
   adjusting the theoretical value of the charging state of the charge storage unit as a function of the detected change;

repeatedly operating in the recuperation mode and the boost mode in an alternating manner; and restoring the adjusted theoretical value of the charging state to a nominal theoretical value of the charging state.

2. The method of claim 1, further comprising:

consuming a charge quantity by the charge storage unit while operating in the recuperation mode;

determining a value of the charge quantity; and increasing the theoretical value of the charging state by the charge quantity.

3. The method of claim 1, wherein:

supplying charge quantity by the charge storage unit while operating in the boost mode;

determining a value of the charge quantity; and reducing the theoretical value of the charging state by the charge quantity.

4. The method of claim 1, wherein the distribution regulator comprises a proportional-integral regulator.

5. A hybrid drive, comprising:

a combustion engine and an electric engine;

a generator driven by the combustion engine;

a charge storage unit; and a control device including a distribution regulator and a charging state theoretical value determining unit, the control device configured to switch operation modes of the hybrid drive between a load point shifting mode, a recuperation mode, and a boost mode, the control device;

wherein in the load point shifting mode, the distribution regulator is configured to predetermine the power or torque supplied by the combustion engine and the electric engine, and the charging state theoretical value determination unit is configured to adjust a theoretical value of the charging state of the charge storage unit as a function of a change in the charging state when previously operating in the recuperation or boost mode;

further wherein the charging state theoretical value determination unit is configured to increase the theoretical value of the charging state of the charge storage unit by a charge quantity consumed by the charge storage unit when operating previously in the recuperation mode.

6. The hybrid drive of claim 5, wherein the charging state theoretical value determination unit is configured to reduce the theoretical value of the charging state of the charge storage unit by a charge quantity supplied by the charge storage unit when operating previously in the boost mode.

7. The hybrid drive of claim 5, wherein the distribution regulator comprises a proportional-integral regulator.

8. The hybrid drive of claim 5, wherein the control device comprises:

a state change-over switch;

a recuperation control having a charge gauge;

a boost control having a charge gauge; and at least two output change-over switches.

9. A method for controlling a hybrid drive, comprising:

providing a combustion engine, a generator driven by the combustion engine, a charge storage unit, an electric engine, and a distribution regulator;

providing a predetermined theoretical value of a charging state of the charge storage unit;

operating in a load point shifting mode, a recuperation mode, or boost mode;

detecting a change in charge state of the charge storage unit when operating in the recuperation mode or boost mode; and switching the operation of the hybrid drive to the load point shifting mode;

wherein, while operating in the load point shifting mode:

identifying a power or torque to be supplied by the combustion engine and the electric engine by the distribution regulator; and adjusting the theoretical value of the charging state of the charge storage unit as a function of the detected change;

further wherein:

while operating in the recuperation mode:

consuming a charge quantity by the charge storage unit, determining a value of the charge quantity, and increasing the theoretical value of the charging state by the charge quantity; and while operating in the boost mode:

supplying a charge quantity by the charge storage unit, determining a value of the charge quantity, and reducing the theoretical value of the charging state by the charge quantity.

10. The method of claim 9, wherein the distribution regulator comprises a proportional-integral regulator.

11. The method of claim 9, further comprising:

repeatedly operating the recuperation mode and the boost mode in an alternating manner; and restoring the adjusted theoretical value of the charging state to a nominal theoretical value of the charging state.

* * * * *